(No Model.)

A. BAUR.
LUBRICATOR.

No. 308,127. Patented Nov. 18, 1884.

Witnesses:
John C. Tunbridge
John M. Speer.

Inventor
August Baur
by his attorneys
Briesen & Steele

UNITED STATES PATENT OFFICE.

AUGUST BAUR, OF COLOGNE, GERMANY.

LUBRICATOR.

SPECIFICATION forming part of Letters Patent No. 308,127, dated November 18, 1884.

Application filed June 17, 1884. (No model.) Patented in Germany July 6, 1883, No. 25,434.

*To all whom it may concern:*

Be it known that I, AUGUST BAUR, a resident of Cologne, in the Empire of Germany, have invented new and useful Improvements in Lubricators, of which the following is a specification.

According to the present invention lubricators for solid or viscous lubricants are constructed of a cylindrical vessel containing the lubricant, into which is fitted a plunger or piston, to the head of which is fixed a cylindrical cap that fits over the outside of the cylinder, and is provided with a series of notches so arranged in combination with one or more pins or projections fixed on the cylinder that on first pressing the plunger and cap down to a certain extent, so as to force a certain quantity of the lubricant out of the cylinder, and then turning the cap and plunger slightly round, the pin or pins are made to catch in one or more of the notches, so as to hold the cap or plunger in that position until a further supply of lubricant is required.

Figure 1:
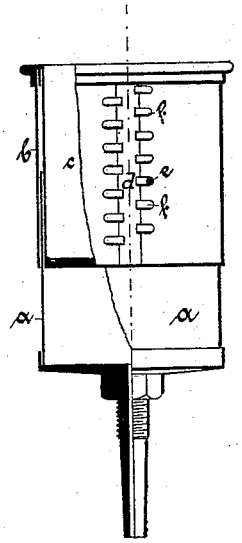
Figure 2:
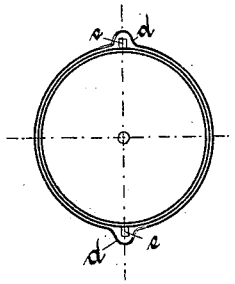

Figure 1 of the accompanying drawings shows a sectional elevation, and Fig. 2 a plan, of one arrangement of the above-described lubricator.

$a$ is the cylindrical vessel, into which is accurately fitted the piston or plunger $c$, to the head of which is fixed the cylindrical cap $b$, that fits over the outer surface of the cylinder. This cap has at two opposite points longitudinal bulges, forming channels $d$, in which fit pins $e$, fixed to the cylinder, and in the sides of such channels are formed rows of notches $ff$, so that on pressing the plunger and cap down to a certain extent and then turning them slightly each pin will be made to enter one of the notches, so as to hold the cap and plunger in that position until the next supply of lubricant is required. The distances between the consecutive notches being made to correspond with the quantity of lubricant required to be supplied to the bearing at one time, it will be seen that by depressing the piston and cap from one notch to the next one at given intervals of time a uniform supply of lubricant will be insured.

Figure 3:
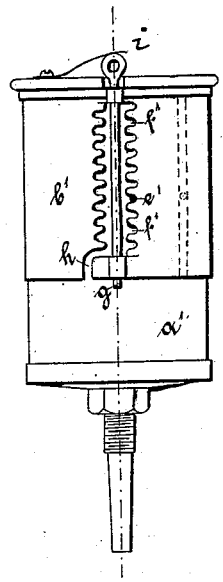
Figure 4:
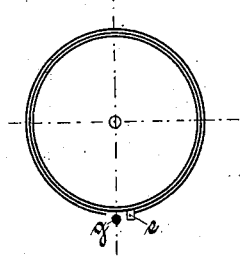

In the modification shown in elevation and plan at Figs. 3 and 4 the cap $b'$ is formed with a single longitudinal slot, instead of the channels $d$, in the sides of which are formed the notches $f'$, into which the pin $e'$, fixed on the cylindrical vessel $a'$, is made to catch on turning the cap slightly in one direction or the other after pressing it downward, as before.

In order to prevent the pin $e'$ from becoming disengaged from the notches through vibrations, a longitudinal pin, $g$, is provided, passing through two eyes on the cap, which pin is withdrawn when the plunger and cap require to be shifted, and which, on being inserted after the pin has been made to enter one of the notches, prevents it from coming out again. The pin $g$ can be held in position by a spring, $i$, so as to prevent it from falling out when the lubricator is applied to parts of machinery with which it is made to revolve. The slot of the cap is made with an opening at $h$, in order to enable the pin $e'$ to pass out of it when the cap and plunger require to be withdrawn for filling the vessel $a'$. The notches $f'$ may be numbered, for readily determining the quantity of lubricant supplied from time to time. If in either of the above arrangements the cap be turned so that the pins $e\ e'$ do not enter the notches, and the plunger be loaded to any desired extent, the lubrication will be automatically effected, as the plunger will be gradually moved downward so as to force out the lubricant. If it be desired to enable the lubricator to be employed automatically in this manner, the cap may be conveniently provided with a second slot or channel without notches, as indicated in the dotted lines at Fig. 3, so that by withdrawing the pin from the notched slot and turning the cap so that the pin will enter the slot without notches there will be no chance for the pin to interrupt the automatic action by entering the notches in consequence of vibrations. In a similar manner additional channels without notches may be provided in the arrangement at Figs. 1 and 2.

Having thus described the nature of this invention and the manner in which the same is to be performed, I claim, in respect of lubricators in which the descent of a piston or plunger is caused to force the lubricant out of the vessel containing the same—

1. The combination of the cap $b$, fixed to the piston or plunger $c$ and fitting over the cylindrical vessel $a$, said cap having a longitudinal channel or slot, with lateral notches, into which a pin or projection on the vessel $a$ enters upon slightly turning the cap, so as to hold the piston in position, substantially as herein described.

2. The combination of the vessel $a'$, with pin $e'$, a piston or plunger with slotted cap $b'$, having notches $f'$, and pin $g$, arranged and operating substantially as herein shown and described.

3. In lubricators having cap $b$, plunger $c$, channel in cap with lateral notches, and pin $e$, the additional channel or slot without notches for the pin $e$ to work in when the supply is required to be effected automatically by loading the piston, as specified.

In testimony whereof I have signed my name to this specification in the presence of two subscribing witnesses.

AUGUST BAUR.

Witnesses:
C. KURTZ,
TH. GUTMAN.